United States Patent
Hahn et al.

(10) Patent No.: US 10,652,797 B2
(45) Date of Patent: May 12, 2020

(54) CHANNEL SWITCHING BASED ON INTERFERENCE EVENTS

(71) Applicant: Hewlett Packard Enterprise Development LP, Houston, TX (US)

(72) Inventors: Dongwoon Hahn, Santa Clara, CA (US); Kishore Srimattirumala, Santa Clara, CA (US); Nethra Muniyappa, Santa Clara, CA (US); Sachin Ganu, San Jose, CA (US); Rajini Balay, Santa Clara, CA (US); Sree Harsha, Santa Clara, CA (US); Mathieu Mercier, Laval (CA)

(73) Assignee: Hewlett Packard Enterprise Development LP, Houston, TX (US)

( * ) Notice: Subject to any disclaimer, the term of this patent is extended or adjusted under 35 U.S.C. 154(b) by 32 days.

(21) Appl. No.: 15/795,750

(22) Filed: Oct. 27, 2017

(65) Prior Publication Data
US 2019/0132780 A1  May 2, 2019

(51) Int. Cl.
*H04W 36/30* (2009.01)
*H04W 36/20* (2009.01)
(Continued)

(52) U.S. Cl.
CPC .......... *H04W 36/30* (2013.01); *H04W 36/06* (2013.01); *H04W 36/20* (2013.01); *H04W 36/36* (2013.01);
(Continued)

(58) Field of Classification Search
CPC . H04W 16/14; H04W 84/12; H04W 72/0453; H04W 24/08; H04W 72/082;
(Continued)

(56) References Cited

U.S. PATENT DOCUMENTS

| 7,512,379 B2 | 3/2009 | Nguyen |
| 8,150,955 B2 | 4/2012 | Busch et al. |

(Continued)

OTHER PUBLICATIONS

Pineoro, M.M. et al., Infrared communication channel optimisation for quasi-diffuse multi-spot wireless indoor networking, (Research Paper), 2002, 4 Pgs.

(Continued)

*Primary Examiner* — Natasha W Cosme
(74) *Attorney, Agent, or Firm* — Brooks, Cameron & Huebsch, PLLC

(57) ABSTRACT

An example access point comprising: a memory; and a processor executing instructions stored in the memory to: determine a first interference event while operating on a first channel, wherein the first channel is designated to the access point in a global channel plan by a network controller based on a global view of a wireless network; switch to operate on a second channel from the first channel for a first amount of time in response to the first interference event; determine a second interference event of the same event type as the first interference event on the first channel, wherein the second interference event is the same event type as the first interference event; and switch to operate on the second channel from the first channel for a longer amount of time than the first amount of time, wherein the second channel is selected based on a local view of the wireless network by the access point.

16 Claims, 4 Drawing Sheets

(51) Int. Cl.
*H04W 36/06* (2009.01)
*H04W 72/08* (2009.01)
*H04W 36/36* (2009.01)
*H04W 72/04* (2009.01)
*H04W 84/12* (2009.01)

(52) U.S. Cl.
CPC ...... *H04W 72/0453* (2013.01); *H04W 72/082* (2013.01); *H04W 84/12* (2013.01)

(58) Field of Classification Search
CPC ... H04W 48/02; H04W 84/045; H04W 28/18; H04W 36/20; H04W 4/02; H04W 72/042; H04W 72/0446; H04W 76/28; H04W 12/00; H04W 28/04; H04W 4/70; H04W 74/02; H04W 88/08; H04W 88/10; H04W 12/08; H04L 43/16; H04L 5/001; H04L 43/08; H04L 43/0888; H04L 5/0055; H04L 12/4633; H04L 41/12; H04L 43/0864; H04L 45/02; H04L 5/003; H04L 5/0073; H04L 67/303; H04L 67/42; H04L 69/22; H04L 1/0003; H04L 27/0006; H04L 5/0053; H04L 5/0078; H04L 1/0009; H04L 5/0094
See application file for complete search history.

(56) References Cited

U.S. PATENT DOCUMENTS

| | | |
|---|---|---|
| 8,576,817 B2 | 11/2013 | Stanforth et al. |
| 9,622,089 B1 | 4/2017 | Ngo et al. |
| 2010/0238871 A1 | 9/2010 | Tosic et al. |
| 2013/0035128 A1 | 2/2013 | Chan et al. |
| 2014/0301328 A1 | 10/2014 | Yacovitch |
| 2015/0215950 A1 | 7/2015 | Amini et al. |
| 2016/0066202 A1 | 3/2016 | Dayanandan et al. |
| 2016/0112969 A1 | 4/2016 | Zhou et al. |
| 2016/0345188 A1 | 11/2016 | Chen et al. |
| 2017/0094651 A1 | 3/2017 | Green et al. |
| 2017/0156149 A1 | 6/2017 | Lin et al. |
| 2018/0139615 A1 | 5/2018 | Cui et al. |

OTHER PUBLICATIONS

European Search Report and Search Opinion Received for EP Application No. 17198978.3, dated May 4, 2018, 10 pages.

Proxim Wireless Corp., Tsunami® 8000 Series (Point-to-point and Point-to-multipoint Products), Software Management Guide, Aug. 2013, 235 Pages.

CHANNEL SWITCHING BASED ON INTERFERENCE EVENTS

BACKGROUND

A network may include a plurality of access points. The access points may be divided within the network into partitions. Each partition may have a channel plan to govern the channels on which each of the plurality of access points operate. The access points may switch operations to a different channel based on interference events.

DETAILED DESCRIPTION

Figure 1:
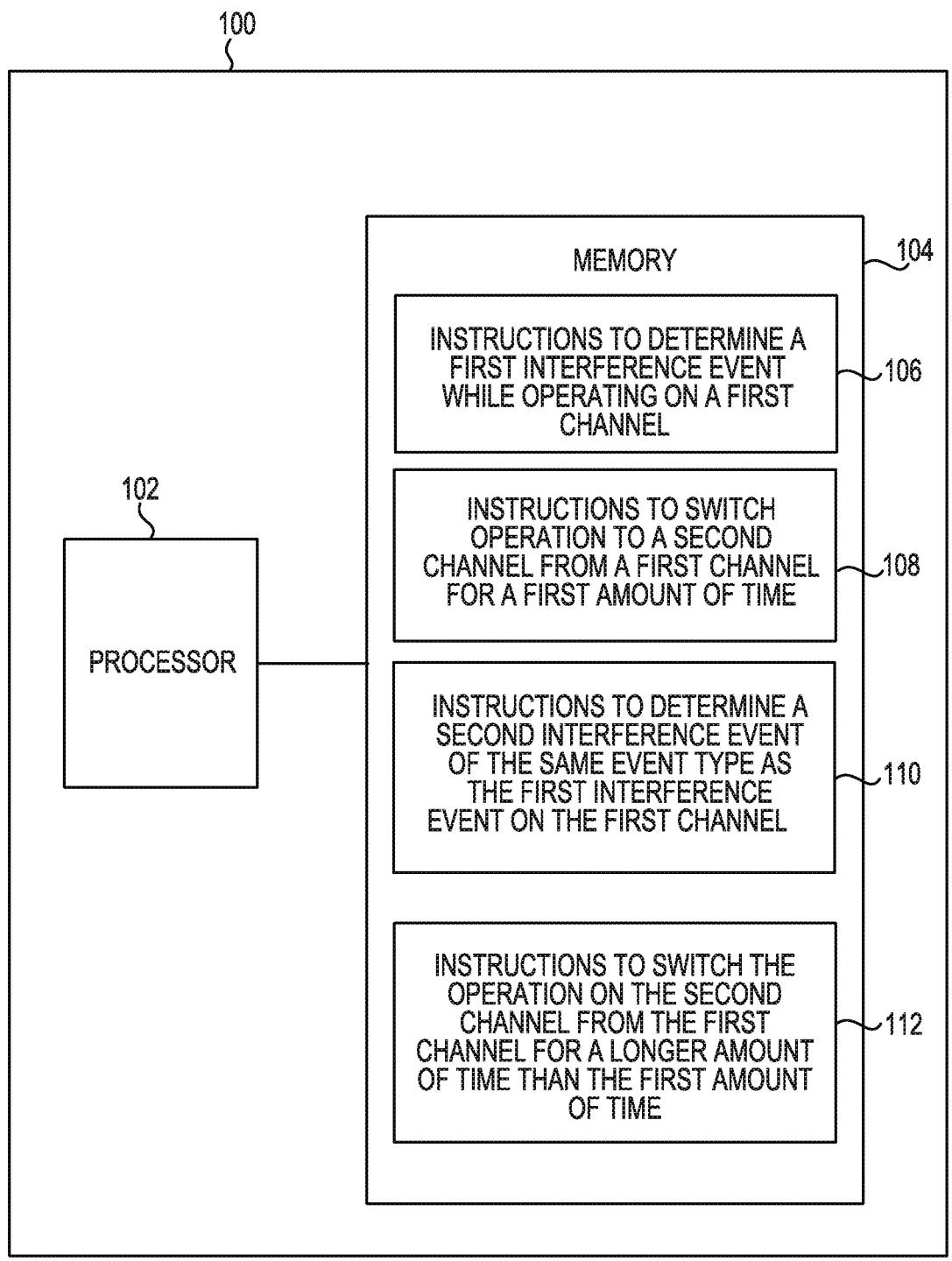
FIG. 1 is an example channel switching consistent with the present disclosure.

A number of systems and methods for channel switching based on interference events are described herein. Access points may be used to provide devices access to a network. As used herein, an access point can refer to a networking device that allows a client device to connect to a wired or wireless network. As used herein, the term "access point" (AP) can, for example, refer to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communication standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces, although examples of the disclosure are not limited to such interfaces. An AP can include a memory resource, including read-write memory, and a hierarchy of persistent memory such as ROM, EPROM, and Flash memory. The network may be a wireless network, for example, a Wireless Local Area Network (WLAN). As used herein, the term "wireless local area network" (WLAN) can, for example, refer to a communications network that links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

In some examples, access points within a WLAN may be divided into a plurality of partitions. As used herein, a partition refers to a division of a system, such as a wireless network, into smaller subsystems. Each partition in a system may operate independently of the other partitions. This may include having a separate controller, operating system, and the like. As used herein, a controller may generally refer to a network device offering centralized network engineering, Internet Protocol services, security and policy controls, and application-aware platforms. In addition to network control, the controller can be also deployed as branch gateways, virtual private network (VPN) concentrators, wireless intrusion prevention system (WIPS) or wireless intrusion detection system (WIDS), spectrum monitors, stateful network firewalls with integrated content filtering, etc. The controller can manage a plurality of APs and/or client devices associated with the APs in the WLAN.

Within a network, each partition may have a global channel plan. As used herein, a global channel plan refers to a disposition of access points among various operating channels. Each access point within a network may have the capability to operate on one or several channels. A global channel plan may therefore assign each of the access points to a particular operating channel. The global channel plan may, for example, look at overlap of the list of operable channels between two or more access points and assign the two or more access points to operate on different operating channels such that the global channel plan does not include a channel overlap within the partition.

During operation, an access point may detect interference signals on its operating channel. As used herein, interference refers to any non-WLAN related energy within a system that interferes with reception and/or emission of wireless signals transmitted within the WLAN. Interference may take the form of noise and/or radar. As used herein, noise refers to interference that is able to occur on any channel and/or frequency. In some examples, noise may occur in response to an amount of traffic occurring on a channel. For example, noise may occur in response to a large amount of activity from client devices on a particular access point or particular channel. Radar refers to interference that may occur on a particular frequency, for example, 5 Gigahertz (GHz). For example, radar events may occur when the access point is operating on a basic service set (BSS) channel.

An access point may be operating on a channel designated by the network controller. As used herein, a network controller refers to a management device on a computer network. For example, a network controller may manage access points within a wireless local area network (WLAN). The terms "network controller" and "controller" are used interchangeably throughout the disclosure. When the access point detects an interference event, the access point may switch to operate on a new channel from the list of operable channels available to the access point for a predetermined amount of time. For example, the predetermined amount of time may be 30 minutes, although examples are not so limited. Once the predetermined amount of time has elapsed, the access point may switch back to operate on its original operating channel. In other examples, the access point may not go back to operate on the channel designated by the network controller. For example, if the channel designated by the network controller detects more than one interference event of the same type within a predetermined amount of time, the access point may switch to operate on a new channel in the list of operable channels for an amount of time that is long enough for the network controller to create a new global channel plan. Here, the new channel is selected based on a local view of the network by the access point. In some examples, the new global channel plan comprises a different designated channel to the access point than the channel designated to the access point in the previous global channel plan. The different designated channel is selected based on a global view of the network by the network controller. In some examples, the access point may send a message to the network controller. The message may indicate that the access point detected interference on its current designated operating channel, the type of interference detected, the channel on which the access point detected the interference, and/or the time at which the interference occurred, although examples are not so limited.

In some examples, the AP has control over channel selection by using a local view of the wireless network and wireless network information. As used herein, a local view, is information that the AP can access about the channels within the designated channel list. This is in contrast to the global channel plan discussed above. The information may be that of interference events that have occurred on operable channels within the global channel plan assigned to the access point. In some examples, the AP is not limited to the particular operating channel designated by the network controller. For example, when interference events occur on the particular operating channel designated by the network controller, the AP may then switch operations to another operable channel for a predetermined amount of time. Moreover, the AP can use the local view information to stay on radar or noise free channels until the next global channel plan is determined by the network controller.

An access point may detect intermittent and/or continuous interference events on a channel within a determined window of time. To prevent frequent channel switching, the AP may blacklist the channel for a determined amount of time. Blacklisting as used herein, refers to an AP switching operation from a channel in response to an interference event for an amount of time that is longer than previous time periods. In some examples, the channel blacklisted is the particular channel designated to the AP by the network controller. In other examples, the channel blacklisted is one in the list of operable channels based on the local view of the wireless network by the AP. In some examples, the AP may blacklist the channel for a period of 12 hours, although examples are not so limited. For example, the AP may blacklist the channel after two consecutive interference events of the same type. For example, when a noise type of interference event occurs on an AP's operating channel for a second consecutive time, the AP may blacklist the channel. In other examples, the interference events do not have to be consecutive for the AP to blacklist the channel. For example, the AP may blacklist a channel after a second interference event of the same event type occurs on the AP, even when a previous inference event was a different event type. The predetermined amount of time for blacklisting or switching from one channel to another may be customizable. In some examples, after the blacklisted time period has expired, the AP may switch the operating channel back to a particular channel designated by the global channel plan.

FIG. 1 is an example access point 100 for channel switching consistent with the present disclosure. Access point 100 may include processor 102. Access point 100 may further include a memory 104 on which instructions may be stored, such as instructions 106, 108, 110, and 112. Although the following descriptions refer to a single processor and a single memory, the descriptions may also apply to a system with multiple processors and multiple memories. In such examples, the instructions may be distributed (e.g., stored) across multiple memories and the instructions may be distributed (e.g., executed by) across multiple processors.

Processor 102 may be a central processing unit (CPU), a semiconductor based microprocessor, and/or other hardware devices suitable for retrieval and execution of instructions stored in non-transitory computer readable medium 104. Processor 102 may fetch, decode, and execute instructions 106, 108, 110,112, or a combination thereof. As an alternative or in addition to retrieving and executing instructions, processor 102 may include at least one electronic circuit that includes electronic components for performing the functionality of instructions 106, 108, 110, 112, or a combination thereof.

Memory 104 may be electronic, magnetic, optical, or other physical storage device that stores executable instructions. Thus memory 104 may be, for example, Random Access Memory (RAM), an Electrically-Erasable Programmable Read-Only Memory (EEPROM), a storage drive, an optical disc, and the like. Memory 104 may be disposed within access point 100, as shown in FIG. 1. In this example, the executable instructions may be "installed" on the access point 100. Additionally, and/or alternatively, memory 104 may be a portable, external or remote storage medium, for example, that allows access point 100 to download the instructions from the portable/external/remote storage medium. In this situation, the executable instructions may be part of an "installation package". As described herein, memory 104 may be encoded with executable instructions for channel switching.

Instructions 106 may include instructions executable by the processor 102 to determine an interference event on a first channel that has been designated to the access point in a global channel plan by the network controller. The interference event type of the interference event may be a first interference event type to occur on the first channel. The interference event type may be at least one of a noise event and a radar event. In this example, the first channel is the particular operating channel that has been designated as a result of the network controller creating a global channel plan for the access point 100, based on a global view of a wireless network. The particular channel may be part of a channel list, wherein the channel list may include a list of operable channels upon which the corresponding access point 100 is able to operate. In some examples, the access point 100 may determine a number of available channels, based on a local view of the wireless network designated to the access point by the network controller when detecting an interference event on a first channel. For example, access point 100 may determine the available operable channels available to the access point when there is an interference even occurring on the first channel and/or another channel.

Instructions 108 may include instructions executable by the processor 102 to switch the operation in response to the determined first interference event from the first channel to a second channel for a predetermined first amount of time. The second channel may be a channel that has been selected based on the local view of the network by the access point 100. For example, access point 100 may switch the operation from the first channel that has been designated as a result of the network controller creating a global channel plan for the access point 100, to a second channel within the list of operable channels that has been selected based on the local view of the network by the access point 100, for a period of 30 minutes. Although, examples are not so limited, the predetermined amount of time is customizable and may be longer or shorter than 30 minutes.

In some examples, the operation of the access point 100 may switch from the second channel to the first channel after the expiration of the first amount of time. In this example, the predetermined first amount of time of 108 is 30 minutes. After 30 minutes, the access point 100 may switch the operation from the second channel to the first channel to resume operation. In other examples, the access point 100 may not resume operation on the first channel after the expiration of 30 minutes. For example, if access point 100 determines that interference events are occurring on the first channel, the access point 100 may continue to operate on the second channel, in other examples the access point 100 may switch operation to a third channel selected based on the local view of the network by the access point 100. Said differently, in this example, the access point 100 may extend the amount of time beyond 30 minutes if there is ongoing interference on the first channel, and/or switch operation to another channel.

Instructions 110 may include instructions executable by the processor 102 to determine a second interference event on the first channel that has been designated to the access point in a global channel plan by the network controller. The interference event type of the second interference event may be at least one of a noise event and a radar event. In this example, the determination of the second interference event type by the access point 100, determines if the second interference event type was the same type of interference event as the first interference event type. Said differently, the access point 100 may determine if the first interference event type and the second interference event type were of the same type. For example, access point 100 may determine if the first interference event type was a radar event, and the second interference event type was also a radar event. Alternatively, access point 100 may determine if the first interference event type was a noise event and the second interference event type was also a noise event. In yet another example, access point 100 may determine if the first interference event type was a noise event and the second interference event type was not of the same type, i.e. a radar event.

Instructions 112 may include instructions executable by the processor 102 to switch the operation on the second channel for a predetermined second amount of time, and the second amount of time is longer than the first amount of time. For example, in response to the determined second interference event on the first channel having the same event type as the first interference event on the first channel the access point 100 may switch operation to the second channel for an amount of time that is longer than the first amount of time. In this example, the access point 100 has determined that the first interference event type and the second interference event type were of the same interference event type, as described in instructions 110 above. For example, access point 100 may switch the operation from the first channel to the second channel within the operable channels for a second amount of time, i.e. a period of 12 hours. Although, examples are not so limited. The predetermined amount of time is customizable and may be longer or shorter than 12 hours. In other examples, when the access point determines that the interference events are not of the same type, it may switch the operation to the second channel for the first amount of time. Access point 100 detects a threshold number of interference events and event types on the first channel designated by the network controller, when the interference events reach the threshold, access point 100 can switch operation to a channel based on a local view of the wireless network for a longer amount of time. The longer amount of time avoids frequent channel switching between the first channel designated by the network controller and the second channel based on the local view of the wireless network.

It should be understood that while terms such as first interference event type and second interference event type are used herein, the interference events may, in some examples, not be consecutive for the access point 100 to switch operation to a new channel for the longer second time period. For example, the access point 100 can detect a first interference event that is a radar event type on a first channel and can switch operation to a second channel for 30 minutes, upon expiration of the 30 minutes, the access point 100 can switch operation to the first channel. In this example, the access point 100 can detect a second interference event that is a noise interference event. In this example, the access point 100 may switch operation from the first channel to the second channel for the first amount of time of 30 minutes since the first radar interference event and the second interference event were different interference event types. In this example, in response to the interference events being of a different type, the access point 100 may switch operation to the first channel after 30 minutes, then a third interference event occurs on the first channel, this time it is second radar event. In this example, the access point 100 may switch operation from the first channel to the second channel for the second amount of time, i.e. 12 hours. Although, examples are not so limited. The first and second amounts of time are customizable and may be longer or shorter than 30 minutes and 12 hours respectively. In some examples, the channel on which the access point is operating may be prone to interference events. The customization of the first, and second, amount of time, prevents frequent channel switching on the access point when it is operating on an interference prone channel.

Figure 2:
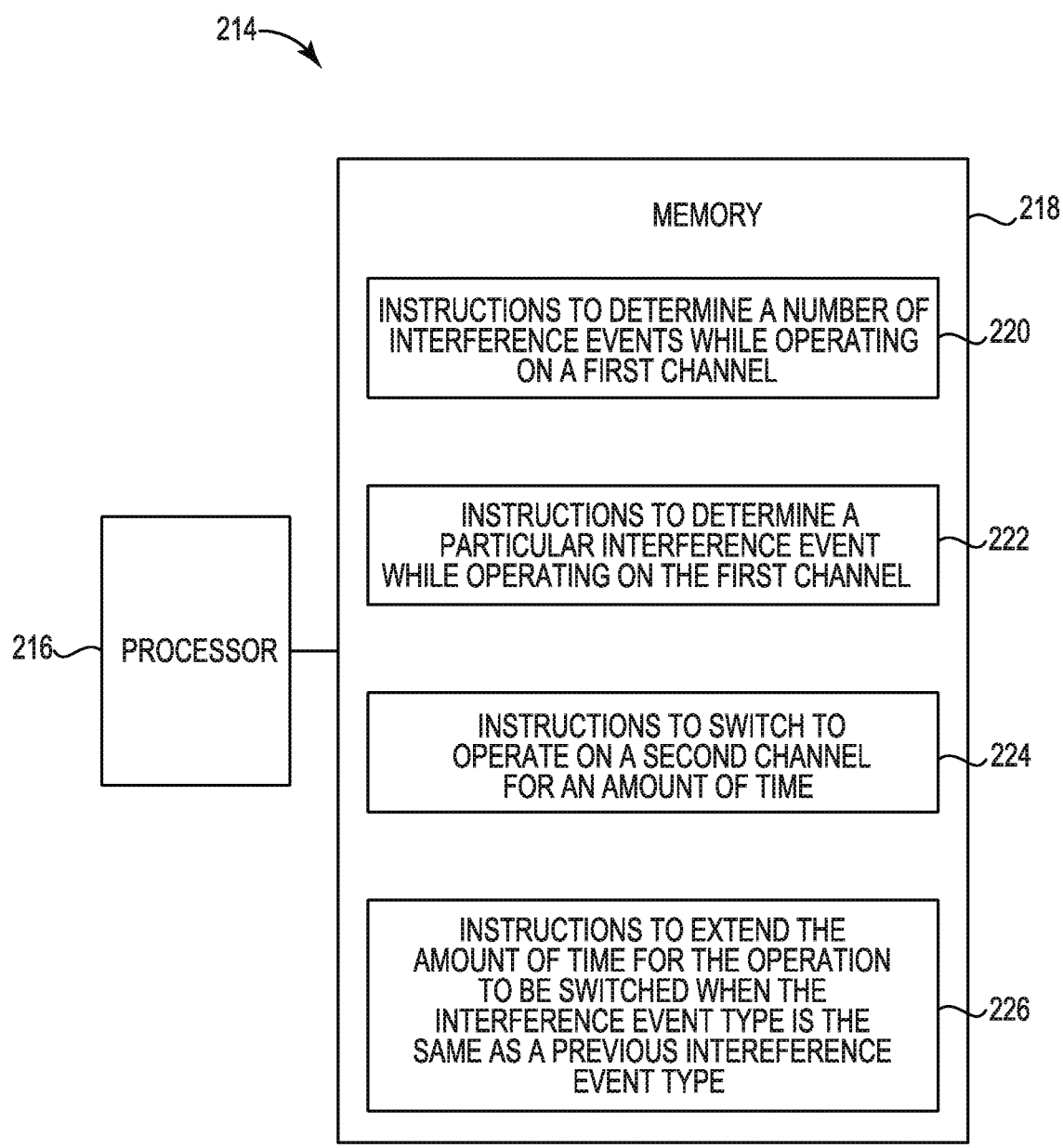
FIG. 2 is an example system for channel switching consistent with the present disclosure.

FIG. 2 is an example system 214 for channel switching consistent with the present disclosure. System 214 may include a processor 216. Processor 216 may be a central processing unit (CPU), a semiconductor based microprocessor, and/or other hardware devices suitable for retrieval and execution of instructions stored in memory 218. Processor 216 may fetch, decode, and execute instructions 220, 222, 224, 226, or a combination thereof. As an alternative or in addition to retrieving and executing instructions, processor 214 may include at least one electronic circuit that includes electronic components for performing the functionality of instructions 220, 222, 224, 226 or a combination thereof.

Memory 218 may be electronic, magnetic, optical, or other physical storage device that stores executable instructions. Thus memory 218 may be, for example, Random Access Memory (RAM), an Electrically-Erasable Programmable Read-Only Memory (EEPROM), a storage drive, an optical disc, and the like. Memory 218 may be disposed within system 214, as shown in FIG. 2. In this example, the executable instructions may be "installed" on the access point. Additionally, and/or alternatively, memory 218 may be a portable, external or remote storage medium, for example, that allows system 214 to download the instructions from the portable/external/remote storage medium. In this situation, the executable instructions may be part of an "installation package". As described herein, memory 218 may be encoded with executable instructions for channel switching.

Instructions 220 may include instructions executable by processor 216 to determine a number of interference events while operating on a first channel at an access point of system 214. In this example, the first channel may not be a channel that has been designated by the network controller, but may be a local channel used by the access point of system 214. A local channel, as used herein, may be a channel that is not the particular channel that has been designated by the network controller, but is one of the list of operable channels available to the access point and determined by local view information of the wireless network. The number of interference events may be at least one of a noise event and a radar event.

Instructions 222 may include instructions executable by processor 216 to determine a particular interference event while operating on the first channel at an access point of system 214. In this example, the particular interference event type of the particular interference event may be at least one of a noise event and a radar event. For example, the access point of system 214 may determine that the particular interference event type is that of a noise interference event and the previous interference event(s) may be that of a radar interference event. In another example, the access point of system 214 may determine that the particular interference event type is that of a radar interference event and the previous interference event(s) may also be that of radar interference event type. Examples are not so limited, and other combinations of event types may occur. In some examples, the access point of system 214 may determine that the particular interference event is a first interference event of a first event type has occurred on the first channel.

Instructions 224 may include instructions executable by processor 216 to switch the operation in response to the determined particular interference event type from the first channel to a second channel for a predetermined amount of time. The second channel may be a local channel that has been selected based on the local view information of the network by the access point of system 214. In some examples, the amount of time operation is switched from the first channel to the second channel is based on the interference event type, and/or if there had been previous occurrences of the same interference event type and/or a different interference event type. For example, when the access point of system 214 determines a first interference event of a first type has occurred on the first channel it may remove the first channel from operation at the access point for a first amount of time. After the expiration of the first amount of time it may resume operation at the first channel.

Instructions 226 may include instructions executable by processor 216 to extend the amount of time for the operation to be switched to the second channel when the interference event type is the same as a previous interference event type, In some examples, these instructions may include blacklisting the channel from use at the access point. In some examples, the access point i.e. 100 of FIG. 1 may notify the network controller that a channel has been blacklisted. Blacklisting, as used herein, is removing from operation, a channel that was made available as a operable channel by the network controller. Additionally, it may be that the channel blacklisted is the particular operating channel that had been designated as a result of the network controller creating a global channel plan for the access point i.e. access point of system 214, as described above. In some examples, blacklisting may be permanent, and/or for a predetermined amount of time. For example, the access point of system 214 may blacklist a channel for 12 hours, 24 hours, 36 hours, 48 hours, and/or another amount of time. Additionally, the access point of system 214 may blacklist a channel for an amount of time until the network controller determines a new global channel plan for the access point. It should be understood that while examples of blacklist times are used herein, they may be customized and be longer or shorter than the example times.

Instructions 226 may include instructions executable by processor 216 to extend the amount of time to be switched when the interference event type is the same as a previous interference event type. For example, instructions 222 may include a predetermined threshold number of permissible interference events of the same interference event type, within a particular time period, before blacklisting. For example, instructions 226 may instruct the access point to blacklist the channel when the determined interference event types have exceeded a predetermined threshold. In this example, the number of interference event types may exceed a predetermined threshold during a particular time period, i.e. 12 hours. In another example, when the first channel has been blacklisted, operation may resume at a second channel. In this example, operation may be switched to a third channel responsive to a third interference event of the same type as the first interference event occurs on the second channel. In this example, the second channel may be removed from operation for an amount of time and/or blacklisted. It should be understood that while terms such as first interference event, second interference event, first channel, second channel, etc. are used herein, they should not be read as limitations but as examples. In some examples, the channel on which the access point is operating may be prone to interference events. The customization of the first, and second amount of time, including blacklisting, prevents frequent channel switching on the access point when it is operating on an interference prone channel.

In the preceding examples, the access point of system 214, detects a threshold number of interference events and event types on the first channel that may be designated by the network controller and/or be a local channel. When the interference events reach the threshold, access point of system 214 can switch operation to a second channel based on a local view of the wireless network and blacklist the first channel. The amount of time blacklisted is customizable and avoids frequent channel switching between the first channel and the second channel. Further, this operation of avoiding frequent channel switching may be applied to thresholds determined by the access points for other operable channels, i.e. second and third channels. In some examples, the channels subject to blacklisting may be channels selected based on the access points local view of the wireless network.

Figure 3:
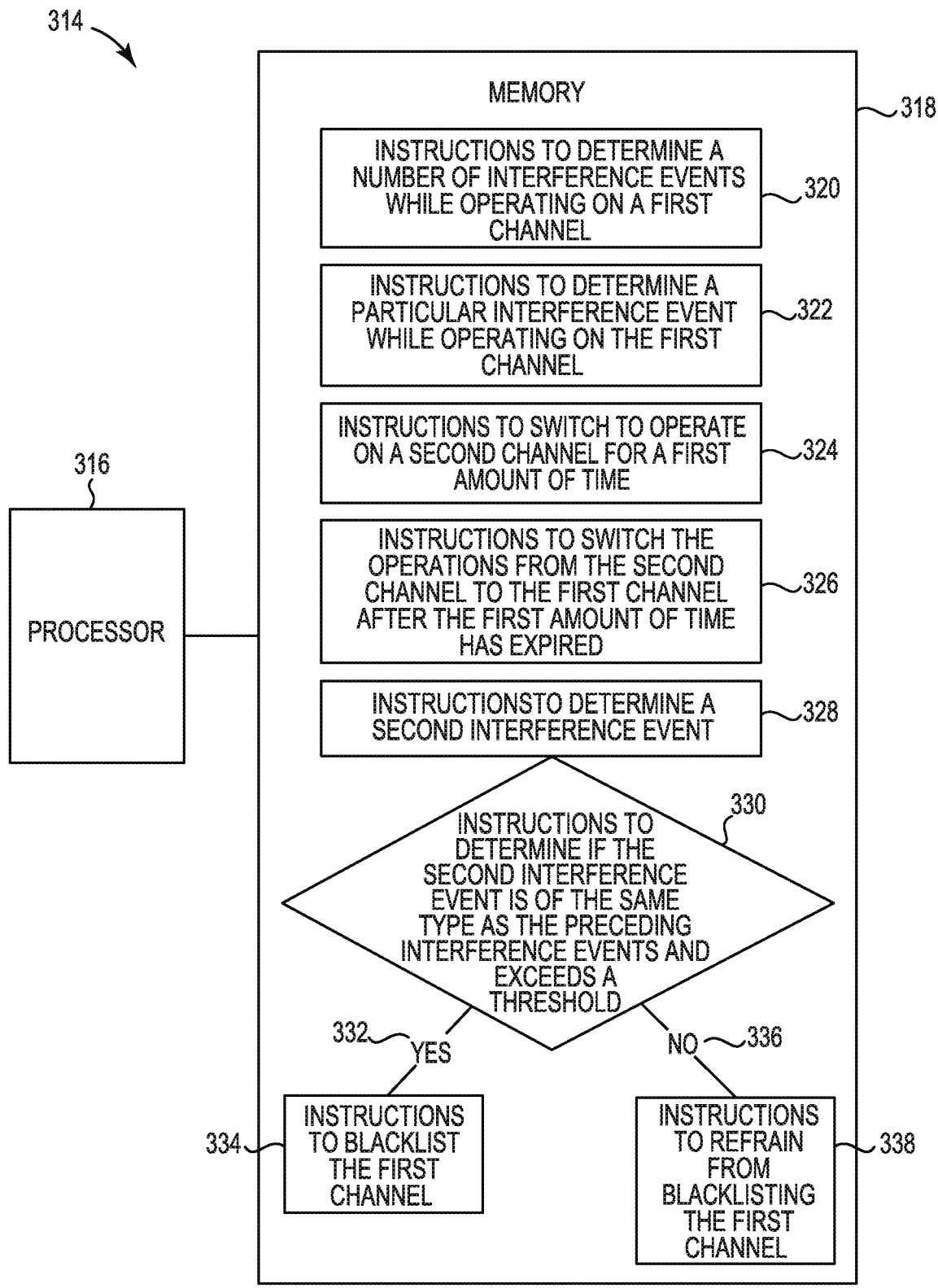
FIG. 3 is another example system for channel switching consistent with the present disclosure.

FIG. 3 is another example system for channel switching consistent with the present disclosure. System 314 may include a processor 316. Processor 316 may be a central processing unit (CPU), a semiconductor based microprocessor, and/or other hardware devices suitable for retrieval and execution of instructions stored in memory 318. Processor 316 may fetch, decode, and execute instructions 320, 322, 324, 326, 328, 330, 332, 334, 336, 338, or a combination thereof. As an alternative or in addition to retrieving and executing instructions, processor 314 may include at least one electronic circuit that includes electronic components for performing the functionality of instructions 320, 322, 324, 326, 328, 330, 332, 334, 336, 338, or a combination thereof.

Memory 318 may be electronic, magnetic, optical, or other physical storage device that stores executable instructions. Thus memory 318 may be, for example, Random Access Memory (RAM), an Electrically-Erasable Programmable Read-Only Memory (EEPROM), a storage drive, an optical disc, and the like. Memory 318 may be disposed within system 314, as shown in FIG. 3. In this example, the executable instructions may be "installed" on the access point. Additionally, and/or alternatively, memory 318 may be a portable, external or remote storage medium, for example, that allows system 314 to download the instructions from the portable/external/remote storage medium. In this situation, the executable instructions may be part of an "installation package". As described herein, memory 318 may be encoded with executable instructions for channel switching.

Instructions 320 may include instructions executable by processor 316 to determine a number of interference events while operating on a first channel. In this example, the first channel may not be the particular channel that has been designated by the network controller, but may be a local channel used by the access point of system 316. A local channel, as used herein, may be a channel that is not the particular channel that has been designated by the network controller, but is one of the operable channels available to the access point and determined by local view information. The number of interference events may be at least one of a noise event and a radar event.

Instructions 322 may include instructions executable by processor 316 to determine a particular interference event type while operating on the first channel at an access point of system 314. In this example, the particular interference event type may be at least one of a noise event and a radar event. For example, the access point of system 314 may determine that the particular interference event type is that of a noise interference event and the previous interference event(s) may be that of radar interference event. In another example, the access point of system 314 may determine that the particular interference event type is that of a radar interference event and the previous interference event(s) may be that of radar interference event. Examples are not so limited, and other combinations of event types may occur. In some examples, the access point of system 314 may determine when a first interference event of a first event type has occurred on the first channel.

Instructions 324 may include instructions executable by processor 316 to switch the operation of the access point of system 314, from the first channel to a second channel for a predetermined first amount of time in response to the determined particular interference event and event type. The second channel may be a channel that has been selected based on the local view of the network by the access point of system 314. In some examples, the predetermined first amount of time the operation from the first channel to the second channel may be switched is based on the interference event type and if there had been previous occurrences of the same interference event type and/or a different interference event type. For example, when the access point of system 314 determines a first interference event of a first type has occurred on the first channel, it may remove the first channel from operation at the access point for the first amount of time. After the expiration of the first amount of time the access point may resume operation at the first channel.

Instructions 326 may include instructions executable by processor 316 to switch the operation from the second channel to the first channel after the first amount of time has expired. In this example, the first amount of time may be customizable. For example, after the expiration of the first amount of time i.e. 30 minutes, operation on the first channel may resume. It should be understood that the amount of time listed in this example, is not to be limiting but interpreted as an example and may be customized to be longer or shorter.

Instructions 328 may include instructions executable by processor 316 to determine a second interference event of the second interference event type while operating on the first channel at an access point of system 314. In this example, the second interference event type may be at least one of a noise event and a radar event. Although, examples are not so limited, and other combinations of event types may occur.

Instructions 330 may include instructions executable by processor 316 to determine a second interference event type while operating on the first channel at an access point of system 314. For example, the access point of system 314 may determine that the particular interference event type is that of a noise interference event type and the previous interference event(s) may be that of radar interference event type. In another example, the access point of system 314 may determine that the particular interference event type is that of a radar interference event type and the previous interference event(s) may also be that of radar interference event type. Although, examples are not so limited, and other combinations of event types may occur.

The determination of instruction 330 may include a predetermined threshold akin to instructions 222 of FIG. 2. For example, the predetermined threshold may be a number of interference events of the same interference type permissible before blacklisting. As a result of the second interference event type being of the same interference event type as a preceding interference event type, and exceeding a threshold then the first channel may be blacklisted. That is, instructions 332 may include instructions executable by the processor to determine whether the interference event types determined by instructions 330 reach and/or exceed a threshold number of interference events. If the interference event type determined by instructions 330 is determined to be greater than the threshold value ("yes" 334), instructions 334 may cause the processor to blacklist the first channel operating at access point of system 314. In some examples, the blacklisted first channel may be the particular channel designated to the access point based on the global view of the network controller. In other examples, the blacklisted first channel may be a local channel selected based on the local view information of the wireless network by the access point of system 314.

In some examples, the access point of system 314 may resume operation at a second channel when the first channel has been blacklisted. In this example, the access point of system 314 may determine a third interference event while operating on the second channel that is the same event type as the first event type, and remove the second channel for a determined amount of time and or blacklist the second channel.

If the threshold value of the number of interference events of the same type determined by instructions 330 are below a threshold value ("no" 336), instructions 338 may be executable by processor 316 to refrain from blacklisting the first channel. That is, instructions 336 may include instructions executable to determine whether the interference event types determined by instructions 330 are below a threshold value. It should be understood that while terms such as first interference event type, and second interference event type are used herein, the interference events may not be consecutive.

In the preceding examples, the access point of system 314, detects a threshold number of interference events and event types on the first channel that may be the particular channel designated by the network controller based on the global view of the wireless network and/or be a local channel selected based on the access points local view of the wireless network. When the interference events reach the threshold, access point of system 314 can switch operation to a second channel based on a local view of the wireless network and blacklist the first channel. The amount of time blacklisted is customizable, and avoids frequent channel switching between the first channel and the second channel. Further, this operation of avoiding frequent channel switching may be applied to thresholds determined by the access points i.e. access point of system 314 for other operable channels, i.e. second and third channels. In some examples, the channels subject to blacklisting may be local channels selected based on the access points local view of the wireless network.

Figure 4:
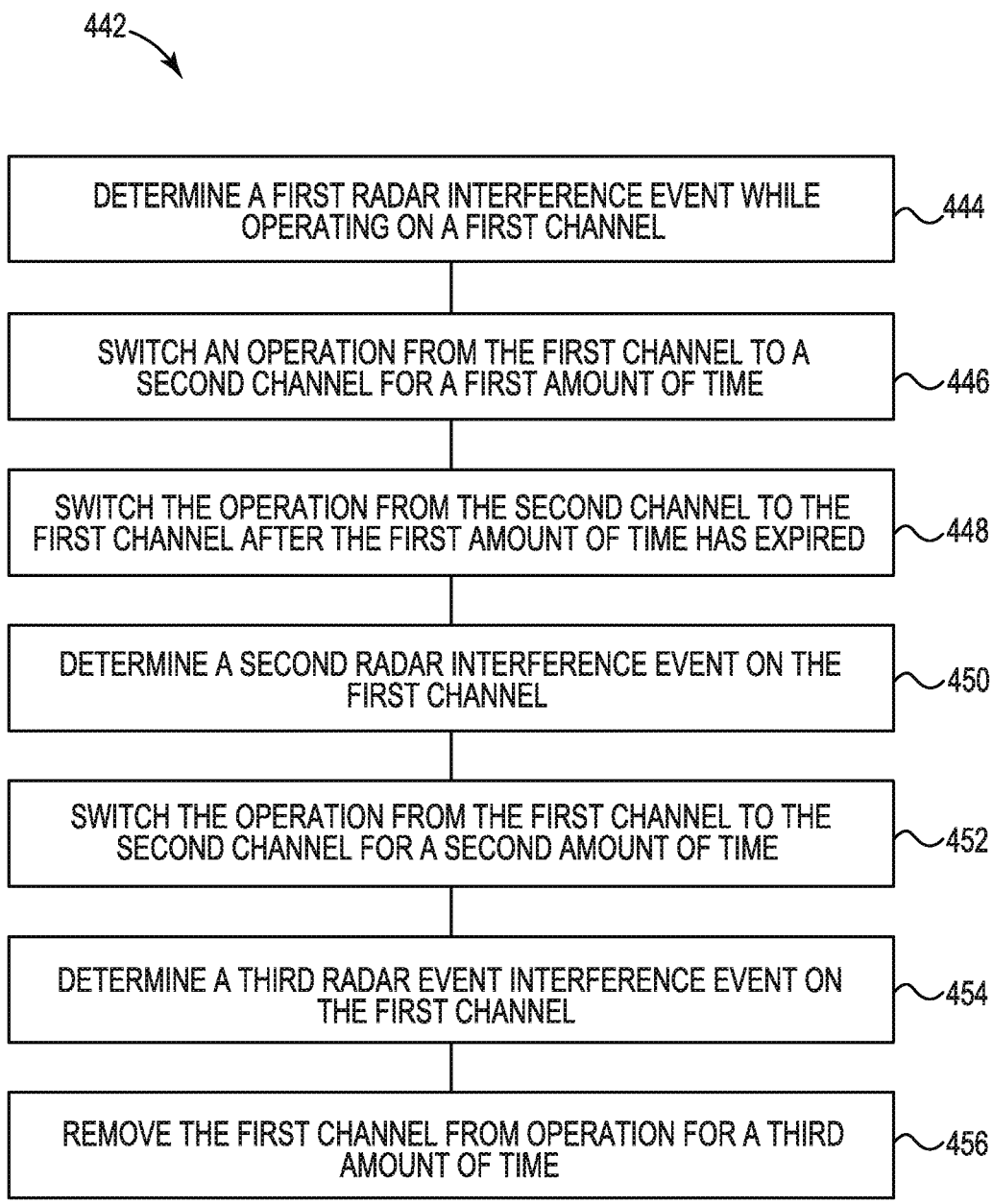
FIG. 4 is an example method for channel switching consistent with the present disclosure.

FIG. 4 is an example method for channel switching consistent with the present disclosure. At 444, method 442 may include determining a first radar interference event while operating on a first channel at an access point akin to access point 100 of FIG. 1. Access point 100 of FIG. 1 is used as an example in throughout describing FIG. 4. In some examples, the interference event type may correspond to a noise event at access point 100. In this example, the interference event type corresponds to a radar event at access point 100. In some examples, the first channel may be the particular channel designated by the network controller based on the global view of the wireless network. In some examples, the first channel may not be the particular channel that has been designated by the network controller, but may be a local channel used by access point 100. A local channel, as used herein, is one of the operable channels available to the access point and selected based on the local view information of the wireless network by access point 100. The number of interference events may be at least one of a noise event and a radar event.

At 446, method 442 may include switching an operation from the first channel to a second channel for a first amount of time. The second channel may be a local channel that has been selected based on the local view of the network by the access point 100. For example, access point 100 may switch the operation from the first channel to the second channel within the operable channels for an amount of time of 30 minutes. Although, examples are not so limited, the predetermined amount of time is customizable and may be longer or shorter than 30 minutes.

At 448, method 442 may include switching the operation from the second channel to the first channel after the first amount of time has expired. For example, access point 100 may switch the operation of the access point from the second channel to the first channel after the expiration of the first amount of time. In this example, the predetermined first amount of time is 30 minutes. After the expiration of 30 minutes, the access point 100 of FIG. 1 may switch the operation from the second channel to the first channel to resume operation. In other examples, the access point 100 may not resume operation on the first channel after the expiration of 30 minutes, for example, if access point 100 determines that interference events are occurring on the first channel. Said differently, in this example, access point 100 may extend the amount of time beyond 30 minutes as a result of ongoing interference events on the first channel. The customization of the first, and subsequent amounts of time, prevent frequent channel switching on the access point when it is operating on an interference prone channel.

At 450, method 442 may include determining a second radar interference event on the first channel. The interference event type may be at least one of a noise event and a radar event. In this example, interference is that of a radar interference event. The determination of the second interference event type may include the access point 100 determining if the second interference event type is the same type of interference event as the first interference event. Said differently, access point 100 may determine if the first interference event and the second interference event were of the same event type. For example, access point 100, may determine if the first interference event type was a radar interference event and the second interference event type was also a radar interference event. Alternatively, access point 100 may determine if the first interference event type was a noise event and the second interference event type was also a noise event. In yet another example, access point 100 of FIG. 1 may determine if the first interference event type was a noise event and the second interference event type was not of the same type, i.e. a radar event. Although, examples are not so limited, and other combinations of event types may occur.

At 452, method 442 may include switching an operation from the first channel to the second channel for a second amount of time in response to the second radar event. The second amount of time is similarly customizable. For example, the second amount of time may be longer than the first amount of time when the second interference event type is the same as the first interference event type. For example, access point 100 may switch the operation from the first channel to the second channel, within the operable channels, for an amount of time longer than 30 minutes, i.e. 12, 15, and/or 24 hours when access point 100 determines that the first interference event type was a radar event and the second interference event type was of the same type, i.e. also a radar event. In other examples, the first channel could be blacklisted after the second interference event. It should be understood that while examples time periods and blacklist times are used herein, they may be customized and be longer or shorter than the example times. In another example, the second amount of time is determined by a time when the network controller is designating a new global channel plan at the access point. In another example, the access point may refrain from returning to the first channel when the first channel has radar interference for an amount of time exceeding a predetermined threshold. Although, examples are not so limited, the determined first and second amount of time is customizable and may be longer or shorter than 30 minutes or 12, 15, and/or 24 hours respectively.

The determination at 450 of method 442 of may include a predetermined threshold akin to instructions 222 of FIG. 2. For example, the predetermined threshold may be a number of interference events of the same interference type permissible before blacklisting. As a result of the second interference event type being of the same interference event type as a preceding interference event type, and exceeding a threshold then the first channel may be blacklisted. That is, method 442, at 450 may include determining whether the interference event types determined at 450 reaches and/or exceed a threshold number of interference events. If the interference event type determined at 450 is determined to be greater than the threshold, method 442, at 452 may cause the processor to blacklist the first channel for a second customizable amount of time. In other examples, the second amount of time may be for a longer period of time. In some examples, the blacklisted first channel may be the particular channel designated to the access point based on the global view of the network controller. In other examples, the blacklisted first channel may be a local channel selected based on the local view information of the wireless network by the access point 100. The customization of the first, and second amount of time, including blacklisting, prevents frequent channel switching on the access point when it is operating on an interference prone channel.

At 454, method 442 may include determining a third radar event on the first channel. The interference event type may be at least one of a noise event and a radar event. In this example, the interference event type is that of a radar interference event. The determination of the third interference event type may include the access point 100 determining if the third interference event was the same type of interference event as the second and/or the first. Said differently, the access point 100 may determine if the first interference event type and the second interference event type were of the same type. For example, access point 100 may determine if the third interference event type was a radar event and the second interference event type was also a radar event. In another example, access point 100 may determine if the third event type was a radar event and the first event type was also a radar event. Alternatively, access point 100 may determine if the first interference event type was a noise event and the second interference event type was also a noise event. In yet another example, access point 100 may determine if the first interference event type was a noise event, the second interference event type was not of the same interference event type, i.e. a radar event, and the third interference event type was a radar interference event. Although, examples are not so limited, and other combinations of event types may occur.

At 456, method 442 may include removing the first channel from operation for a third amount of time. For example, access point 100 may blacklist the first channel from the operable channels. In some examples, the access point 100 may notify the network controller that a channel has been blacklisted. In some examples, the first channel may be blacklisted until a new global channel plan is designated to the access point by the network controller. In other examples, the first channel may be blacklisted to a customizable amount of time. Blacklisting, as used herein, means to remove from operation a channel that was made available as a operable channel by the network controller. Additionally, it may be that the channel blacklisted is the particular operating channel that had been designated as a result of the network controller creating a global channel plan for the access point as described above. In other examples, the blacklisted channel may be a local channel selected by local view information of the wireless network by the access point. In some examples, blacklisting may be permanent, and/or for a predetermined amount of time. For example, access point 100 may blacklist a channel for 12 hours, 24 hours, 36 hours, 48 hours, and/or another amount of time. Additionally, the access point 100 may blacklist a channel for a period of time until the network controller determines a new global channel plan for the access point. While terms such as first interference event type and second interference event type are used herein, the interference events may not be consecutive for the access point, i.e. access point 100 to switch operation to a new channel for the second time period.

The amount of time blacklisted is customizable and avoids frequent channel switching between the first channel, the second channel and subsequent channels within the operable channels. Further, this operation of avoiding frequent channel switching may be applied to thresholds determined by the access points. In some examples, the channels subject to blacklisting may be channels selected based on the access points local view of the wireless network as well as particular channels designated by the network controller based on the global view of the network.

In the foregoing detail description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to any number of such elements and/or features.

What is claimed:

1. An access point, comprising:
a memory; and
a processor executing instructions stored in the memory to:
   determine a first interference event of a first event type while operating on a first channel, wherein the first channel is designated to the access point in a global channel plan by a network controller based on a global view of a wireless network;
   switch to operate on a second channel from the first channel for a first amount of time in response to the first interference event;
   switch back to operate on the first channel from the second channel upon expiration of the first amount of time;
   determine a second interference event on the first channel; and
   for the second interference event:
      upon determining that the second interference event is of a second event type that is different than the first event type, switch to operate on the second channel from the first channel for the first amount of time, or
      upon determining that the second interference event is of the first event type, switch to operate on the second channel from the first channel for a second amount of time that is longer than the first amount of time;
   wherein the second channel is selected based on a local view of the wireless network by the access point.

2. The access point of claim 1, wherein the first event type is one of a noise event and a radar event, and wherein the second event type is the other of a noise event and a radar event.

3. The access point of claim 1, wherein operating on the second channel for the second amount of time that is longer than the first amount of time reduces frequent channel changes between the first channel designated by the network controller in the global channel plan and the second channel selected by the access point.

4. The access point of claim 3, further comprising instructions executable by the processor to, upon determining that a number of interference events of the first event type occurring on the first channel during a particular time period exceed a predetermined threshold, blacklist the first channel until a new global channel plan is generated by the network controller, wherein the new global channel plan comprises a channel designated to the access point that is different than the first channel.

5. A system, comprising:
an access point;
a memory; and
a processor executing instructions stored in the memory to:
   determine a number of interference events while operating on a first channel, wherein the first channel is designated to the access point in a global channel plan by a network controller based on a global view of a wireless network;
determine a first interference event while operating on the first channel;
switch to operate on a second channel from the first channel for a first amount of time in response to the first interference event;
switch to operate on the second channel for a first amount of time in response to the first interference event;
switch back to operate on the first channel from the second channel upon expiration of the first amount of time;
determine a second interference event on the first channel; and
switch to operate on the second channel from the first channel, wherein:
 an amount of time for the operation to be switched to the second channel is the first amount of time upon determining that an event type of the second interference event is of a different event type than the first interference event, or
 an amount of time for the operation to be switched to the second channel is extended to a second amount of time that is longer than the first amount of time upon determining that an event type of the second interference event is of a same event type as the first interference event.

6. The system of claim 5, further comprising instructions to:
determine event types of a number of interference events on the first channel during a particular time period; and
blacklist the first channel when a number of interference events for a particular event type exceeds a predetermined threshold.

7. The system of claim 6, further comprising instructions to:
notify the network controller that a channel has been blacklisted.

8. The system of claim 5, further comprising instructions to:
determine the event types as radar interference and noise interference.

9. The system of claim 5, wherein the second channel is selected based on a local view of the wireless network by the access point.

10. The system of claim 5, wherein the instructions executable to remove a channel from operation for the first or second amount of time are customizable.

11. A method, comprising:
determining, at an access point, a first interference event while operating on a first channel, wherein the first interference even is a radar interference event, and wherein the first channel is designated to the access point in a global channel plan by a network controller based on a global view of a wireless network;
switching an operation from the first channel to a second channel for a first amount of time in response to the first interference event;
switching the operation from the second channel to the first channel after the first amount of time has expired;
determining a second interference event on the first channel;
switching the operation from the first channel to the second channel, wherein:
 the operation is switched to the second channel for the first amount of time upon determining that the second interference event is a noise interference event, or
 the operation is switched to the second channel for a second amount of time that is longer than the first amount of time upon determining that the second interference event is a radar interference event;
determining a third radar interference event on the first channel; and
removing the first channel from operation for a third amount of time.

12. The method of claim 11, further comprising:
determining a second noise interference event on the first channel; and
switching the operation from the first channel to the second channel for the second amount of time.

13. The method of claim 12, wherein the second amount of time is determined by a time when the network controller is designating a new global channel plan for the access point.

14. The method of claim 11, further comprising:
blacklisting the first channel and refraining from resuming operations to the first channel when the first channel has radar interference for an amount of time exceeding a predetermined threshold.

15. The method of claim 14, comprising notifying the network controller that a channel has been blacklisted until a new global channel plan is designated by the network controller.

16. The method of claim 11, wherein multiple radar interference events of a same type that occur on the second channel initiate operation switching to a third channel.

* * * * *